US011520524B2

(12) United States Patent
Grosz et al.

(10) Patent No.: US 11,520,524 B2
(45) Date of Patent: *Dec. 6, 2022

(54) HOST ADAPTIVE MEMORY DEVICE OPTIMIZATION

(71) Applicant: Micron Technology, Inc., Boise, ID (US)

(72) Inventors: Nadav Grosz, Broomfield, CO (US); David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/157,539

(22) Filed: Jan. 25, 2021

(65) Prior Publication Data
US 2021/0141570 A1    May 13, 2021

Related U.S. Application Data

(63) Continuation of application No. 16/235,664, filed on Dec. 28, 2018, now Pat. No. 10,901,658.

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595;
(Continued)

(56) References Cited

U.S. PATENT DOCUMENTS 5,222,224 A * 6/1993 Flynn .................. G06F 12/0822
                                                      711/120
6,085,035 A    7/2000 Ungar
(Continued)

FOREIGN PATENT DOCUMENTS

CN    111538684 A    8/2020

OTHER PUBLICATIONS

K. Cheng and C. Wu, "Peeraid: A resilient path-aware storage system for open clouds," 2009 IEEE International Conference on Service-Oriented Computing and Applications (SOCA), 2009, pp. 1-8, doi: 10.1109/SOCA.2009.5410452. (Year: 2009).*

(Continued)

*Primary Examiner* — Daniel C. Chappell
(74) *Attorney, Agent, or Firm* — Schwegman Lundberg & Woessner, P.A.

(57) ABSTRACT

Devices and techniques for host adaptive memory device optimization are provided. A memory device can maintain a host model of interactions with a host. A set of commands from the host can be evaluated to create a profile of the set of commands. The profile can be compared to the host model to determine an inconsistency between the profile and the host model. An operation of the memory device can then be modified based on the inconsistency.

21 Claims, 4 Drawing Sheets

(58) Field of Classification Search
CPC ...... G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153; G06K 9/00–6298;
G06N 3/00–126; G06N 5/00–048; G06N
7/00–08; G06N 10/00; G06N 20/00–20;
G06N 99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
27/00–3293; H01L 2225/00–1094; H03M
7/00–707; H04L 9/00–38; H04L
12/00–66; H04L 41/00–5096; H04L
49/00–9094; H04L 61/00–6095; H04L
67/00–42
See application file for complete search history.

(56) References Cited

U.S. PATENT DOCUMENTS

| 6,134,710 | A | 10/2000 | Levine et al. | |
|---|---|---|---|---|
| 6,219,825 | B1* | 4/2001 | Burch | G06F 8/4442 |
| | | | | 717/158 |
| 7,904,894 | B2 | 3/2011 | Entin et al. | |
| 8,938,581 | B2* | 1/2015 | Cho | G06F 8/63 |
| | | | | 711/108 |
| 9,898,385 | B1* | 2/2018 | O'Dowd | G06F 11/3664 |
| 10,108,340 | B2* | 10/2018 | Rupanagunta | G06F 3/0607 |
| 10,776,279 | B2* | 9/2020 | Lo | G06F 3/0604 |
| 10,901,658 | B2* | 1/2021 | Grosz | G06F 3/0679 |
| 2003/0023764 | A1 | 1/2003 | Reese et al. | |
| 2003/0101443 | A1 | 5/2003 | Kosche et al. | |
| 2003/0126590 | A1* | 7/2003 | Burrows | G06F 8/437 |
| | | | | 712/E9.036 |
| 2004/0098715 | A1 | 5/2004 | Aghera et al. | |
| 2005/0034105 | A1 | 2/2005 | Hind et al. | |
| 2008/0250213 | A1* | 10/2008 | Holt | G06F 11/1666 |
| | | | | 711/159 |
| 2009/0064136 | A1 | 3/2009 | Dow et al. | |
| 2009/0300267 | A1 | 12/2009 | Schneider | |
| 2011/0145825 | A1 | 6/2011 | Matsuda et al. | |
| 2011/0214022 | A1 | 9/2011 | Burchard et al. | |
| 2012/0054726 | A1 | 3/2012 | Doing et al. | |
| 2015/0261572 | A1* | 9/2015 | Caufield | G06F 11/34 |
| | | | | 718/102 |
| 2016/0070496 | A1 | 3/2016 | Cohen et al. | |
| 2017/0300263 | A1 | 10/2017 | Helmick | |
| 2019/0001861 | A1 | 1/2019 | Hegde et al. | |
| 2019/0018610 | A1* | 1/2019 | Hegde | G06F 8/4441 |
| 2019/0303002 | A1 | 10/2019 | Frolikov | |
| 2020/0210104 | A1 | 7/2020 | Grosz et al. | |

OTHER PUBLICATIONS

Cheng, K., et al., "Peeraid: A Resilient Path-Aware Storage System For Open Clouds", 2009 IEEE International Conference on Service-Oriented Computing and Applications (SOCA), Taipei, (2009), 1-8.

* cited by examiner

| Memory Device Command Type ~210 | Average Data Size ~220 | Average Pendency Interval ~230 | Relationship to Other Memory Device Commands ~240 | Average Rate of Arrival ~250 |
|---|---|---|---|---|
| SINGLE BLOCK WRITE (212) | 4 PAGES | 2 MS | FOLLOWS 3 MULTIPLE BLOCK READ COMMANDS | 6 COMMANDS PER SINGLE BLOCK WRITE COMMAND OR 3 SECONDS |
| SINGLE BLOCK READ (214) | 8 PAGES | 3 MS | FOLLOWS 4 MULTIPLE BLOCK WRITE COMMANDS | 9 COMMANDS PER SINGLE BLOCK READ COMMAND OR 2 SECONDS |
| MULTIPLE BLOCK WRITE (216) | 2 BLOCKS | 5 MS | FOLLOWS TWO SINGLE BLOCK READ COMMANDS | 2 COMMANDS PER MULTIPLE BLOCK WRITE COMMAND OR 10 SECONDS |
| MULTIPLE BLOCK READ (218) | 6 BLOCKS | 8 MS | --- | 8 COMMANDS PER MULTIPLE BLOCK READ COMMAND OR 6 SECONDS |
| ... | ... | ... | ... | ... |

FIG. 2

HOST ADAPTIVE MEMORY DEVICE OPTIMIZATION

PRIORITY APPLICATION

This application is a continuation of U.S. application Ser. No. 16/235,664, filed Dec. 28, 2018, which is incorporated herein by reference in its entirety.

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), or magnetoresistive random-access memory (MRAM), among others.

Flash memory is utilized as non-volatile memory for a wide range of electronic applications. Flash memory devices typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data.

However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate, To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) can extend adjacent a string of storage cells to form a channel for the storages cells of the string. In the example of a vertical string, the polysilicon structure can be in the form of a vertically extending pillar. In some examples the string can be "folded," and thus arranged relative to a U-shaped pillar. In other examples, multiple vertical structures can be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs can include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures), The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2 illustrates an example of a host model database.

DETAILED DESCRIPTION

Memory devices, such as NAND flash devices, can include a variety of operational parameters that affect memory device performance under various circumstances. Operational profiles can be installed in the memory devices based on the expected operating conditions of the host. For example, an energy constrained mobile telephone can exhibit short periods of intense writing and reading activity followed by long periods of inactivity. In such as example, write caches can be increased to enable faster writes, the inactive periods being used to copy the write cache to more compact storage (e.g., SLC cache to TLC storage). However, such a profile can be inappropriate for a server application involve regular high-volume writes or reads.

An issue that can arise when a profile is selected and implemented in a memory device to meet a particular operating scenario is change. Although it can be possible to manually update the profile, performance degradation usually would become severe to prompt such an action. Moreover, simply switching between profiles can be fruitless if the change in behavior is temporary, or if the available profiles do not fully meet the operational behavior of the host.

To address these issues a host adaptive memory device optimization can be used. Here, a host model is used to quantify expected host behavior. Current host command activity is measured and compared to this host model to determine deviations in expected behavior. The memory device can then update an operational parameter based on this deviation. Such an arrangement enables a highly tailored and automatic modification of the memory device to meet changing host behaviors. Further, over time, the host model can be updated to enable more consistent alignment of the memory device operations with the host activity.

Dynamically adjusting control parameters of the memory device based on changes in host behavior enhances memory device performance and enables the memory devices to complete memory device commands faster and more efficiently. This reduces the latencies experienced by different applications running on a host and provides a significant technical improvement over typical memory devices. Additional details and examples are provided below.

Figure 1:
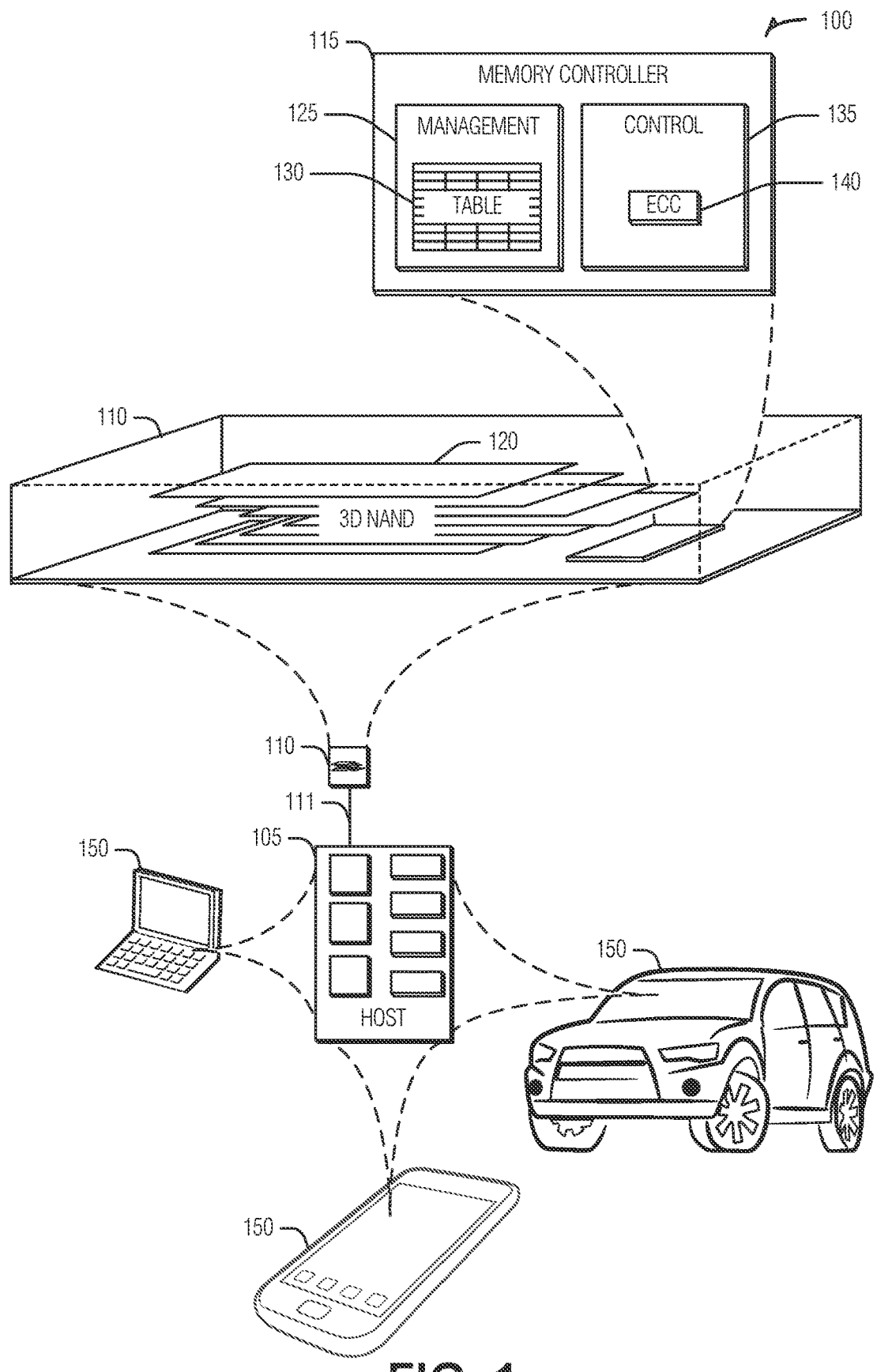
FIG. 1 illustrates an example of an environment including a memory device upon which one or more embodiments may be implemented.

FIG. 1 illustrates an example of an environment 100 including a host 105 and a memory device 110 configured to communicate over a communication interface 111. The host 105 and the memory device 110 may be included in a variety of products 150, such as IoT devices (e.g., a refrigerator or other appliance, sensor, motor or actuator, mobile communication device, automobile, mobile phone, drone, etc.) to support processing, communications, or control of a given one of the products 150.

One or more communication interfaces 111 can be used to transfer data between the memory device 110 and the host 105. Communication interfaces 111 can include a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host 105 can include a host system, an electronic device, a processor, a CPU, a memory card reader, or one or more other electronic devices. In some examples, the host 105 may be a machine having some portion of the components discussed in reference to the machine 400 of FIG. 4.

The memory device 110 includes a memory controller 115 and a memory array 120 including, for example, one or more individual memory die (e.g., a stack of three-dimensional (3D) NAND die). In 3D architecture semiconductor memory technology, vertical structures are stacked in multiple tiers, and coupled to form physical pages, to increase the storage density of a memory device (e.g., a storage device) in a given footprint (i.e. form factor).

The memory controller 115 can receive instructions from the host 105 via communication interface 111, and can communicate with the memory array 120, such as to transfer data to (e.g., write or erase) or from (e.g., read) one or more of the memory cells, planes, sub-blocks, blocks, or pages of the memory array 120. The memory controller 115 can include, among other things, circuitry or firmware, including one or more components or integrated circuits. For example, the memory controller 115 can include one or more memory control units, circuits, control circuitries, or components configured to control access across the memory array 120 and to provide a translation layer between the host 105 and the memory device 110. The memory controller 115 can include one or more I/O circuits, lines, or interfaces to transfer data to or from the memory array 120. The memory controller 115 can include a memory manager 125 and an array controller 135.

The memory controller 115 can also implement host adaptive optimization. To this end, the memory controller 115 is configured to maintain a host model of host interactions with the memory device 110. Maintaining the host model can include storing it (e.g., in a management table 130), and can also include modifying or updating the host model. An example host model is illustrated in FIG. 2. Generally, the host model is a set of metrics that describe the likely behavior of the host. This can be used to tailor a variety of memory device 110 operations to meet this behavior. For example, if the host has small consistent writes, the memory controller 115 can schedule maintenance operations, such as garbage collection, outside of these write periods.

While a host model enables a degree of customization, it cannot, by itself, account for changes to the host 105. Such changes can include a new workload (e.g., application, entities the host 105 serves, etc.), new operating software, new hardware, new firmware, etc. To adapt to these changes, the memory controller 115 is configured to analyze a set of memory device commands—such as those in the command queue of memory controller 115—to determine whether those commands are consistent with the host model. If the set of commands are inconsistent with the host model, the memory controller 115 is configured to modifies an operational parameter of the memory device 110.

In an example, the memory controller 115 is configured to generate or update the host model by computing an average or other statistical measure in relation to the commands after given time intervals (e.g., every 30 seconds) or after a predetermined number of commands (e.g., every 1000 commands). Such updates enable the memory controller 115 tailor its operational parameters to the host's behavior, the host adaptive technique being used during transitions or temporary deviations from the generally host behavior enshrined in the host model.

In an example, the computed average or other statistical measure represents an average behavior of the command queue across all of the commands with regard to command type (e.g., single block write, single block read, multiple block write, or multiple block read). In an example, an average depth of the command queue, average data size of the commands in the command queue, average time between receipt of commands in the command queue, or average duration of command pendency of commands in the command queue can be computed and stored as respective entries in the host model.

In an example, to compute the average depth of the command queue, the memory controller 115 is configured to count the number of commands pending in the command queue after each given time interval elapses. This number is then averaged with the average previously stored in the respective host model entry. In an example, to compute an average data size of the commands in the command queue, the memory controller 115 is configured to obtain command status information—such as the command size (e.g., how many pages or blocks are to be written/read)—for each command pending in the command queue. In an example, the command status information collection is limited to distinct time intervals. The memory controller 115 can then compute an average of the obtained command sizes. At the end of the given time interval, the computed average data size is stored in the host model In an example, an average time between receipt of commands in the command queue—e.g., during each given time interval—is computed based on timestamps of received commands. Here, the memory controller 115 can compute a difference between timestamps of pairs of sequentially received commands and an average of the differences. At the end of the given time interval, the result is stored in the host model. In an example, an average duration of command pendency can be computed as a difference between each timestamp and a current time and an average of the differences determined.

The memory controller 115 is configured to determine whether received commands—e.g., commands in the command queue—are consistent with the host model. In an example, the memory controller 115 is configured to obtain current command queue information (e.g., average depth of the command queue, average data size of the commands in the command queue, average time between receipt of commands in the command queue, average duration of command pendency of commands, status information of particular types of commands in the command queue, etc.) and compare it to any combination of one or more entries of the host model.

In an example, if the difference between the current depth of the command queue and the average depth of the command queue exceeds a threshold (e.g., the difference is greater than or less than the threshold by an absolute number or by a given percentage amount), the set of commands in the command queue are inconsistent with the host model. In an example, the memory controller 115 is configured to limit the analysis to a given set of commands from the command queue that correspond to a particular type of command.

The memory controller 115 is configured to adjust an operational parameter of the memory device 110 when observations about the current commands received from the host 105 are inconsistent with the host model. For example, the memory controller 115 can restore an adaptive timer to a default value or another predetermined value, increase or decrease a write cache size, increase or decrease write cache flush frequency, align more or less blocks corresponding to commands in the command queue, increase or decrease garbage collection frequency, or change a wear leveling from static to dynamic or vice versa, to modify operation of the memory device 110.

The array controller 135 can include, among other things, circuitry or components configured to control memory operations associated with writing data to, reading data from, or erasing one or more memory cells of the memory device 110. The memory operations can be based on, for example, host commands received from the host 105, or internally generated by the memory manager 125 (e.g., in association with wear leveling, error detection or correction, etc.).

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

The memory array 120 can include multiple memory cells arranged in, for example, a number of devices, planes, sub-blocks, blocks, or pages. As one example, a 48 GB TLC NAND memory device can include 18,592 bytes of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (PIE) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the memory device 110 in pages and erased in blocks. However, one or more memory operations (e.g., read, write, erase, etc.) can be performed on larger or smaller groups of memory cells, as desired. The data transfer size of a memory device 110 is typically referred to as a page, whereas the data transfer size of a host is typically referred to as a sector.

Different types of memory cells or memory arrays 120 can provide for different page sizes or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, an MLC NAND flash device may have a higher bit error rate than a corresponding single-level cell (SLC) NAND flash device. As such, the MLC device may require more metadata bytes for error data than the corresponding SLC device.

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. ECC component 140, for example, may detect or compute a bit-error-rate (BER) associated with performing a number of memory operations. The BER may correspond to bit errors occurring in latches of an I/O bus, internal errors of controller 115, errors occurring in one or more of the NAND arrays, or any one or more of the multi-level cell(s) (MLC) of the memory device 110. The memory controller 115 can be configured to actively detect and recover from error occurrences (e.g., bit errors, operation errors, crash conditions, stalls, hang ups, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors. The memory controller 115 may include a command queue (not shown) that tracks memory commands received from a host. Commands in the queue may be executed by controller 115 in a first-in first-out (FIFO) manner, stack manner, out of sequence, according to priority, or in any other suitable order. The command queue includes status information associated with each command in the queue. Such status information may include a BER of the given command, a remaining number of blocks associated with the given command, and a timestamp representing a time interval since the memory device 110 received the given command.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection (e.g., BER monitoring) or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more components of the memory device 110 (e.g., various information associated with a memory array or one or more memory cells coupled to the memory controller 115). For example, the management tables 130 can include information regarding block age, block erase count, error history, error parameter information, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts (e.g., an error parameter) is above a threshold (e.g., an allowable error threshold), the bit error can be referred to as an uncorrectable bit error. The management tables 130 can maintain a count of correctable or uncorrectable bit errors, among other things.

The memory array 120 can include multiple memory cells arranged in, for example, a number of devices, planes, sub-blocks, blocks, or pages. As one example, a 48 GB TLC NAND memory device can include 18,592 bytes of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the memory device 110 in pages and erased in blocks. However, one or more memory operations (e.g., read, write, erase, etc.) can be performed on larger or smaller groups of memory cells, as desired. The data transfer size of a memory device 110 is typically referred to as a page, whereas the data transfer size of a host is typically referred to as a sector.

Different types of memory cells or memory arrays 120 can provide for different page sizes or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, an MLC NAND flash device may have a higher bit error rate than a corresponding single-level cell (SLC) NAND flash device. As such, the MLC device may require more metadata bytes for error data than the corresponding SLC device.

FIG. 2 illustrates an example of a host model database 200. Host model database 200 includes multiple entries 212, 214, 216, 218 for different command types and specifies average parameters for each command type. Each entry includes a memory device command type field 210, an average data size field 220, an average pendency interval field 230, a relationship to other memory device commands field 240, and an average rate of arrival field 250.

The memory device command type field 210 includes values representing different types of commands. Examples of the command types include single block write, single block read, multiple block write, and multiple block read commands, among others. When commands are encountered—for example, commands obtained from a command queue of the memory device—the command type of each command can be determined and entered into the memory device command type field 210. In an example, this entry can influence possible values for the other fields (e.g., fields 220-250).

For example, if it is determined that a given set of commands stored in the command queue were received during a given time interval are single block write commands, an average data size of each of these single block write commands can be computed and stored in the average data size field 220 of entry 212. In an example, after successful completion of each of the single block write command on the memory device, a difference, for each single block write command, between a timestamp corresponding to when the respective single block write command completed and the timestamp corresponding to when the respective single block write command was received from the host can be computed and entered into the average pendency interval 203 of entry 212. Host model module 160 averages these computed differences of each single block write command and stores the computed differences in the average pendency interval field 230 corresponding to entry 212 associated with the single block write command field 210. Host model module 160 may also compute a difference between timestamps representing when pairs of the single block write commands were sequentially received, compute an average of these differences across all of the single block write commands received during the given time interval, and store this average of the differences in average rate of arrival field 250 of entry 212 associated with the single block write command field 210.

For the inter-command relationship field 240, a relationship between different types of commands can be determined and stored. For example, a determination is made that each of the single block write commands was always, or more than a threshold number of times, received following receipt of three multiple block read commands from the host. Here, the command queue can be analyzed to determine that the multiple block write commands are separated from each other by three sequential multiple block read commands. In this case, an indication that single block write commands follow three sequential multiple block read commands is stored in the field 240 of entry 212.

In an example, the number of non-single block write commands—such as commands of a type other than or different from the command type specified in command type field 210 of single block write command entry 212—that were received between each of the received single block write commands can be counted. This count can be stored as the average rate of arrival in field 250 for the single block write command entry 212.

Similar operations to those noted above can be performed to populate the average data size field 220, average pendency interval field 230, relationship to other memory device commands field 240, and average rate of arrival field 250 in database 200 corresponding to the remaining memory device command type field 210 of entries 214, 216 and 218.

Figure 3:
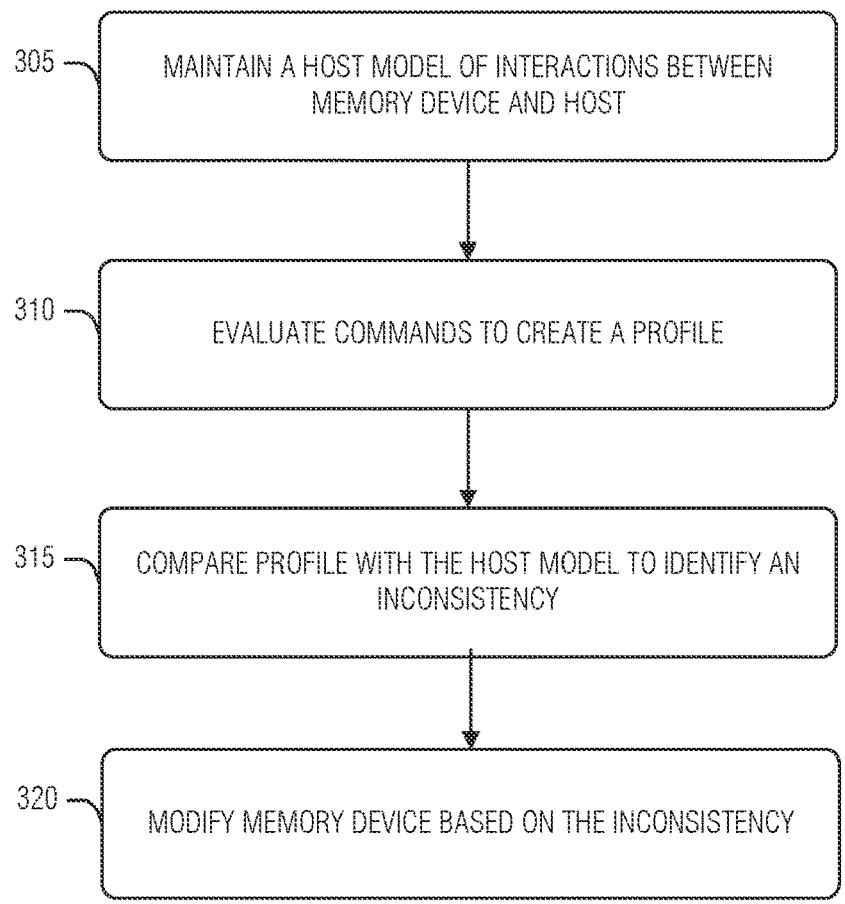
FIG. 3 is a flow chart of an example of a method for host adaptive memory device optimization.

FIG. 3 is a flow chart of an example of a method 300 for host adaptive memory device optimization. The operations of the method 300 are implemented in computer hardware, such as that described above (e.g., a memory controller) or below (e.g., processing circuitry).

At operation 305, the memory device maintains a host model of interactions with the host. The host model is a data structure used to identify patterns in memory device-to-host interactions. The data structure can take several forms, such as a database like that illustrated in FIG. 2, in an artificial neural network (ANN), in one or more parameterized functions, etc. In an example, the host model is one of several host models provided to the memory device at the time of manufacture. These host models can be instantiated given a perceived type of host, such as a mobile telephone host model, a battery operated sensor host model, a mains power enabled server host model, etc. In an example, the memory device creates the host model via observations with the host.

At operation 310, a set of commands from the host are evaluated to create a profile of the set of commands. This set of commands can be a current set of commands (e.g., within a time window that includes the current time), commands in a command queue of the memory device, or a selection of previous commands that the memory device received. In an example, to evaluate the set of commands, measuring a characteristic for commands in the set of commands is measured. In an example, the characteristic is one of data size, pendency interval, inter-command interval, relationship to other types of memory device operations, rate of arrival, depth of command queue. Thus, the profile is some numerical result from a measurement of the commands. The numerical result can include additional processing, such as computing a mean, median, mode, regression analysis, or other measures that can be used for comparison.

At operation 315, the profile is compared to the host model to determine an inconsistency between the profile and the host model. Here, the inconsistency is a deviation from a value of the profile predicted by the host model and the actual value of the profile. In an example, the profile is created via a different calculation than the corresponding value in the host model. For example, the host model value can be a single value combination of several data elements (e.g., an average) whereas the profile value is a single data element value. In an example, to compare the profile to the host model, representation of the characteristic of a single command is retrieved from the host model and a respective characteristic of a subset of commands from the set of commands is compared to the representation of the characteristic. After the subset of commands are compared to the host model, a determination that the respective characteristic is larger or smaller than the representation of the characteristic by more than a threshold is made. The value (e.g., magnitude) of the determination is the inconsistency.

In an example, the subset of commands corresponds to a single type of command. In an example, the type of command is one of read, write, flush, erase, move, or garbage collection, Thus, here, like commands are compared to like commands. In an example, the representation of the characteristic is an average. As noted above, other statistical measures can be used. For example, an ANN can be trained to produce a certain output when exposed to the characteristic. the Output of the ANN (e.g., the classification of the characteristics produced by the ANN) can be the representation of the characteristic. Other techniques, such as the result of a function, can also be used. A unifying theme amongst these techniques, however, is an ability to compare the representation of the characteristics to the corresponding value stored in the host model.

In an example, a number of the subset of commands is beyond a second threshold to produce the inconsistency. This example places a limit on how sensitive the comparison is to deviations. Thus, if the subset of commands is not significant (e.g., beyond the threshold), they are considered outliers and will not affect the operation of the memory device.

In an example, the set of commands are commands in a command queue for the memory device. Here, the inconsistency is a difference between a depth of the command queue and an average depth of the command queue stored in the host model. This is a form of meta-analysis whereby the command flow characteristics, and not necessarily the commands themselves, are compared. Such analysis can be useful to determine burst patterns of the host, sleep-wake cycles, etc. In an example, the meta-analysis can be combined with the specific command analysis. Thus, command queue depth of write commands can be compared, for example.

At operation 320, an operation of the memory device is modified based on the inconsistency determined in operation 315. In an example, modifying the operation of the memory device includes changing at least one of a host timeout interval, a watchdog timer, a write cache size, a flush frequency, a block alignment parameter, garbage collection frequency, or a wear leveling parameter. Modifying these operations can produce different effects on the actual or perceived operation of the memory device vis-à-vis the host. For example, if the host is operating with a bursty nature in which short periods of high-activity are followed by longer periods of inactivity, then increasing write cache can increase write throughput for the host; the data being written from the cache during the inactive periods.

In an example, at least one of the host timeout interval or the watchdog timer are changed based on a measure of time relative to receipt of a given command and receipt of a subsequent reset signal from the host for the given command. Such an adjustment brings the timers of the memory device into alignment of traditional host behavior. Thus, if, for example, the intra-command and reset timing is reduced, shorting the timeout enables a faster resumption after a likely failed operation.

In an example, the method 300 can be extended to include operations to update the host model to account for the inconsistency. This enables the host model to track changes in the host over time. These changes cab occur due to software or firmware changes on the host, different peripheral device attachments or simply changing workloads. Updating the host model enables dynamic host behavior profiling to ensure better operation of the memory device with respect to host operations. In an example, to update the host model, an entry of an average characteristic for the set of commands is modified to include the inconsistency in the average characteristic. Thus, the average is modified to also average in the new value from the characteristics for the set of commands. In an example, the average characteristic is one of data size, pendency interval, relationship to other types of memory device operations, or rate of arrival.

Figure 4:
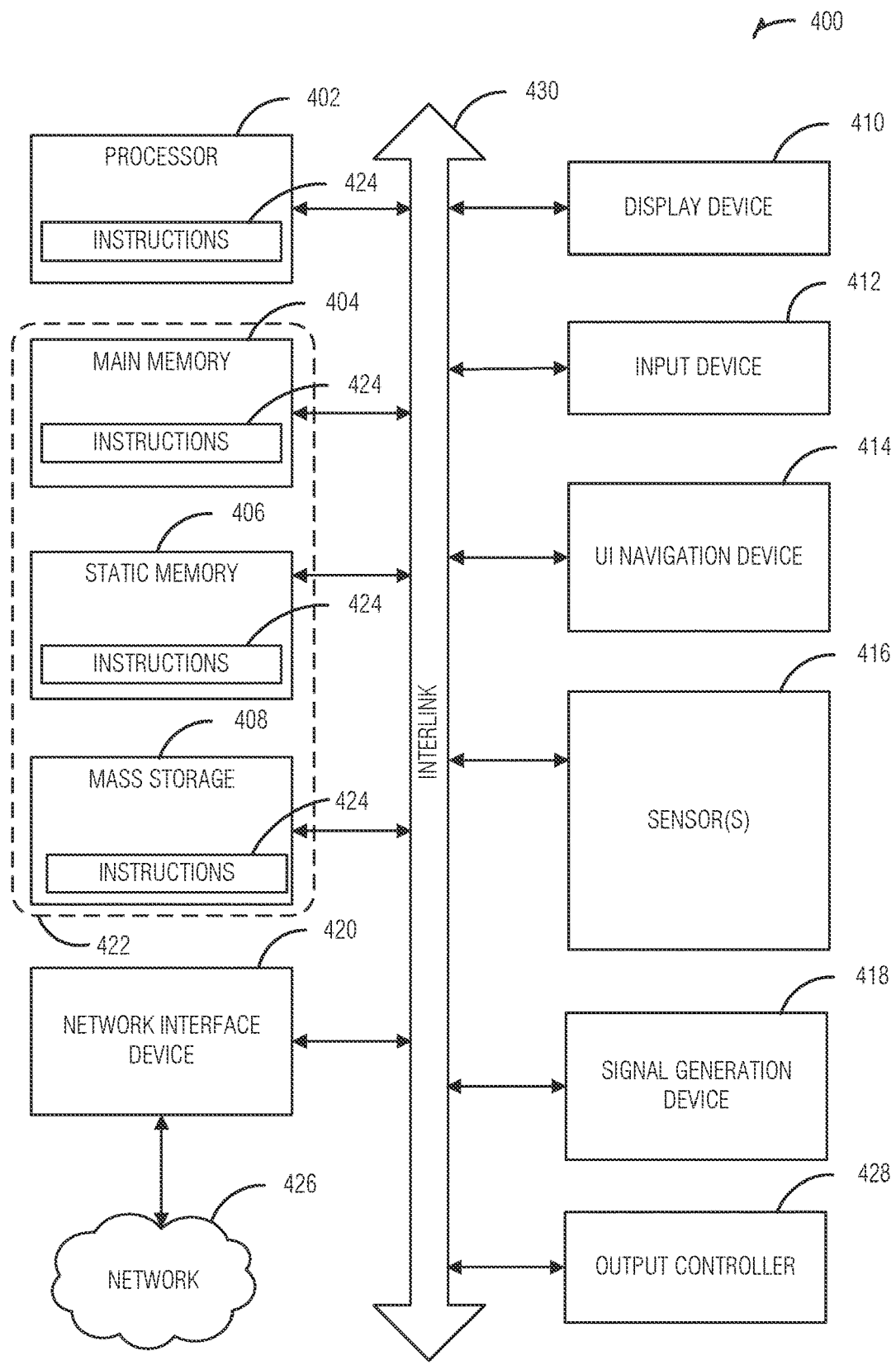
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein can perform. In alternative embodiments, the machine 400 can operate as a standalone device or can be connected (e.g., networked) to other machines. In a networked deployment, the machine 400 can operate in the capacity of a server machine, a client machine, or both in server-client network environments. In an example, the machine 400 can act as a peer machine in peer-to-peer (P2P) (or other distributed) network environment. The machine 400 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 400 (e.g., the host device 105, the memory device 110, etc.) can include a hardware processor 402 (e.g., a central processing unit (CPU), a graphics processing unit (GPU), a hardware processor core, or any combination thereof, such as the memory controller 115, etc.), a main memory 404 and a static memory 406, some or all of which can communicate with each other via an interlink (e.g., bus) 408. The machine 400 can further include a display unit 410, an alphanumeric input device 412 (e.g., a keyboard), and a user interface (UI) navigation device 414 (e.g., a mouse). In an example, the display unit 410, input device 412 and UI navigation device 414 can be a touch screen display. The machine 400 can additionally include a storage device (e.g., drive unit) 408, a signal generation device 418 (e.g., a speaker), a network interface device 420, and one or more sensors 416, such as a global positioning system (GPS) sensor, compass, accelerometer, or other sensor. The machine 400 can include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 408 can include a machine readable medium 422 on which is stored one or more sets of data structures or instructions 424 (e.g., software) embodying or utilized by any one or more of the techniques or functions described herein. The instructions 424 can also reside, completely or at least partially, within the main memory 404, within static memory 406, or within the hardware processor 402 during execution thereof by the machine 400, In an example, one or any combination of the hardware processor 402, the main memory 404, the static memory 406, or the storage device 408 can constitute the machine readable medium 422.

While the machine readable medium 422 is illustrated as a single medium, the term "machine readable medium" can include a single medium or multiple media (e.g., a centralized or distributed database, or associated caches and servers) configured to store the one or more instructions 424.

The term "machine readable medium" can include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 (e.g., software, programs, an operating system (OS), etc.) or other data are stored on the storage device 421, can be accessed by the memory 404 for use by the processor 402. The memory 404 (e.g., DRAM) is typically fast, but volatile, and thus a different type of storage than the storage device 421 (e.g., an SSF), which is suitable for long-term storage, including while in an "off" condition. The instructions 424 or data in use by a user or the machine 400 are typically loaded in the memory 404 for use by the processor 402. When the memory 404 is full, virtual space from the storage device 421 can be allocated to supplement the memory 404; however, because the storage 421 device is typically slower than the memory 404, and write speeds are typically at least twice as slow as read speeds, use of virtual memory can greatly reduce user experience due to storage device latency (in contrast to the memory 404, e.g., DRAM). Further, use of the storage device 421 for virtual memory can greatly reduce the usable lifespan of the storage device 421.

In contrast to virtual memory, virtual memory compression (e.g., the Linux® kernel feature "ZRAM") uses part of the memory as compressed block storage to avoid paging to the storage device 421. Paging takes place in the compressed block until it is necessary to write such data to the storage device 421. Virtual memory compression increases the usable size of memory 404, while reducing wear on the storage device 421.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 424 can further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks) such as those defined by the Third Generation Partnership Project (3GPP) families of standards (e.g., 3G, 4G, 5G, Long Term Evolution (LTE), etc.), Plain Old Telephone (POTS) networks, and wireless data networks (e.g., Institute of Electrical and Electronics Engineers (IEEE) 802.11 family of standards known as Wi-Fi®), IEEE 802.15.4 family of standards, peer-to-peer (P2P) networks, among others. In an example, the network interface device 420 can include one or more physical jacks (e.g., Ethernet, coaxial, or phone jacks) or one or more antennas to connect to the communications network 426. In an example, the network interface device 420 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that can store, encoding or carrying instructions for execution by the machine 400, and includes digital or analog communications signals or other intangible medium to facilitate communication of such software.

ADDITIONAL EXAMPLES

Example 1 is a memory device for host adaptive memory device optimization, the memory device comprising: storage to maintain a host model of interactions with a host; and processing circuitry to: evaluate a set of commands from the host to create a profile of the set of commands; compare the profile to the host model to determine an inconsistency between the profile and the host model; and modify an operation of the memory device based on the inconsistency.

In Example 2, the subject matter of Example 1, wherein, to evaluate the set of commands, the processing circuitry is configured to measure a characteristic for commands in the set of commands.

In Example 3, the subject matter of Example 2, wherein the characteristic is one of data size, pendency interval, inter-command interval, relationship to other types of memory device operations, rate of arrival, depth of command queue.

In Example 4, the subject matter of any of Examples 2-3, wherein, to compare the profile to the host model, the processing circuitry is configured to: retrieve representation of the characteristic of a single command from the host model; compare a respective characteristic of a subset of commands from the set of commands to the representation of the characteristic; and determine that the respective characteristic is larger or smaller than the representation of the characteristic by more than a threshold to produce the inconsistency.

In Example 5, the subject matter of Example 4, wherein the representation of the characteristic is an average.

In Example 6, the subject matter of any of Examples 4-5, wherein a number of the subset of commands is beyond a second threshold to produce the inconsistency.

In Example 7, the subject matter of any of Examples 2-6, wherein the subset of commands corresponds to a single type of command.

In Example 8, the subject matter of Example 7, wherein the type of command is one of read, write, flush, erase, move, or garbage collection.

In Example 9, the subject matter of any of Examples 1-8, wherein the set of commands are commands in a command queue for the memory device, and wherein the inconsistency is a difference between a depth of the command queue and an average depth of the command queue stored in the host model.

In Example 10, the subject matter of any of Examples 1-9, wherein, to modify the operation of the memory device, the processing circuitry is configured to change at least one of a host timeout interval, a watchdog timer, a write cache size, a flush frequency, a block alignment parameter, garbage collection frequency, or a wear leveling parameter.

In Example 11, the subject matter of Example 10, wherein at least one of the host timeout interval or the watchdog timer are changed based on a measure of time relative to receipt of a given command and receipt of a subsequent reset signal from the host for the given command.

In Example 12, the subject matter of any of Examples 1-11, wherein the processing circuitry is configured to update the host model to account for the inconsistency.

In Example 13, the subject matter of Example 12, wherein, to update the host model, the processing circuitry is configured to modify modifying an entry of an average characteristic for the set of commands to include the inconsistency in the average characteristic.

In Example 14, the subject matter of any of Examples 12-13, wherein the average characteristic is one of data size, pendency interval, relationship to other types of memory device operations, or rate of arrival.

Example 15 is a method for host adaptive memory device optimization, the method comprising: maintaining, by a memory device, a host model of interactions with a host; evaluating a set of commands from the host to create a profile of the set of commands; comparing the profile to the host model to determine an inconsistency between the profile and the host model; and modifying an operation of the memory device based on the inconsistency.

In Example 16, the subject matter of Example 15, wherein evaluating the set of commands includes measuring a characteristic for commands in the set of commands.

In Example 17, the subject matter of Example 16, wherein the characteristic is one of data size, pendency interval, inter-command interval, relationship to other types of memory device operations, rate of arrival, depth of command queue.

In Example 18, the subject matter of any of Examples 16-17, wherein comparing the profile to the host model includes: retrieving representation of the characteristic of a single command from the host model; comparing a respective characteristic of a subset of commands from the set of commands to the representation of the characteristic; and determining that the respective characteristic is larger or smaller than the representation of the characteristic by more than a threshold to produce the inconsistency.

In Example 19, the subject matter of Example 18, wherein the representation of the characteristic is an average.

In Example 20, the subject matter of any of Examples 18-19, wherein a number of the subset of commands is beyond a second threshold to produce the inconsistency.

In Example 21, the subject matter of any of Examples 16-20, wherein the subset of commands corresponds to a single type of command.

In Example 22, the subject matter of Example 21, wherein the type of command is one of read, write, flush, erase, move, or garbage collection.

In Example 23, the subject matter of any of Examples 15-22, wherein the set of commands are commands in a command queue for the memory device, and wherein the inconsistency is a difference between a depth of the command queue and an average depth of the command queue stored in the host model.

In Example 24, the subject matter of any of Examples 15-23, wherein modifying the operation of the memory device includes changing at least one of a host timeout interval, a watchdog timer, a write cache size, a flush frequency, a block alignment parameter, garbage collection frequency, or a wear leveling parameter.

In Example 25, the subject matter of Example 24, wherein at least one of the host timeout interval or the watchdog timer are changed based on a measure of time relative to receipt of a given command and receipt of a subsequent reset signal from the host for the given command.

In Example 26, the subject matter of any of Examples 15-25, comprising updating the host model to account for the inconsistency.

In Example 27, the subject matter of Example 26, wherein updating the host model includes modifying an entry of an average characteristic for the set of commands to include the inconsistency in the average characteristic.

In Example 28, the subject matter of any of Examples 26-27, wherein the average characteristic is one of data size, pendency interval, relationship to other types of memory device operations, or rate of arrival.

Example 29 is a machine readable medium including instructions for host adaptive memory device optimization, the instructions, when executed by processing circuitry, cause the processing circuitry to perform operations comprising: maintaining, by a memory device, a host model of interactions with a host; evaluating a set of commands from the host to create a profile of the set of commands; comparing the profile to the host model to determine an inconsistency between the profile and the host model; and modifying an operation of the memory device based on the inconsistency.

In Example 30, the subject matter of Example 29, wherein evaluating the set of commands includes measuring a characteristic for commands in the set of commands.

In Example 31, the subject matter of Example 30, wherein the characteristic is one of data size, pendency interval, inter-command interval, relationship to other types of memory device operations, rate of arrival, depth of command queue.

In Example 32, the subject matter of any of Examples 30-31, wherein comparing the profile to the host model includes: retrieving representation of the characteristic of a single command from the host model; comparing a respective characteristic of a subset of commands from the set of commands to the representation of the characteristic; and determining that the respective characteristic is larger or smaller than the representation of the characteristic by more than a threshold to produce the inconsistency.

In Example 33, the subject matter of Example 32, wherein the representation of the characteristic is an average.

In Example 34, the subject matter of any of Examples 32-33, wherein a number of the subset of commands is beyond a second threshold to produce the inconsistency.

In Example 35, the subject matter of any of Examples 30-34, wherein the subset of commands corresponds to a single type of command.

In Example 36, the subject matter of Example 35, wherein the type of command is one of read, write, flush, erase, move, or garbage collection.

In Example 37, the subject matter of any of Examples 29-36, wherein the set of commands are commands in a command queue for the memory device, and wherein the inconsistency is a difference between a depth of the command queue and an average depth of the command queue stored in the host model.

In Example 38, the subject matter of any of Examples 29-37, wherein modifying the operation of the memory device includes changing at least one of a host timeout interval, a watchdog timer, a write cache size, a flush frequency, a block alignment parameter, garbage collection frequency, or a wear leveling parameter.

In Example 39, the subject matter of Example 38, wherein at least one of the host timeout interval or the watchdog timer are changed based on a measure of time relative to receipt of a given command and receipt of a subsequent reset signal from the host for the given command.

In Example 40, the subject matter of any of Examples 29-39, wherein the operations comprise updating the host model to account for the inconsistency.

In Example 41, the subject matter of Example 40, wherein updating the host model includes modifying an entry of an average characteristic for the set of commands to include the inconsistency in the average characteristic.

In Example 42, the subject matter of any of Examples 40-41, wherein the average characteristic is one of data size, pendency interval, relationship to other types of memory device operations, or rate of arrival.

Example 43 is a system for host adaptive memory device optimization, the system comprising: means for maintaining, by a memory device, a host model of interactions with a host; means for evaluating a set of commands from the host to create a profile of the set of commands; means for comparing the profile to the host model to determine an inconsistency between the profile and the host model; and means for modifying an operation of the memory device based on the inconsistency.

In Example 44, the subject matter of Example 43, wherein the means for evaluating the set of commands include means for measuring a characteristic for commands in the set of commands.

In Example 45, the subject matter of Example 44, wherein the characteristic is one of data size, pendency interval, inter-command interval, relationship to other types of memory device operations, rate of arrival, depth of command queue.

In Example 46, the subject matter of any of Examples 44-45, wherein the means for comparing the profile to the host model include: means for retrieving representation of the characteristic of a single command from the host model; means for comparing a respective characteristic of a subset of commands from the set of commands to the representation of the characteristic; and means for determining that the respective characteristic is larger or smaller than the representation of the characteristic by more than a threshold to produce the inconsistency.

In Example 47, the subject matter of Example 46, wherein the representation of the characteristic is an average.

In Example 48, the subject matter of any of Examples 46-47, wherein a number of the subset of commands is beyond a second threshold to produce the inconsistency.

In Example 49, the subject matter of any of Examples 44-48, wherein the subset of commands corresponds to a single type of command.

In Example 50, the subject matter of Example 49, wherein the type of command is one of read, write, flush, erase, move, or garbage collection.

In Example 51, the subject matter of any of Examples 43-50, wherein the set of commands are commands in a command queue for the memory device, and wherein the inconsistency is a difference between a depth of the command queue and an average depth of the command queue stored in the host model.

In Example 52, the subject matter of any of Examples 43-51, wherein the means for modifying the operation of the memory device include means for changing at least one of a host timeout interval, a watchdog timer, a write cache size, a flush frequency, a block alignment parameter, garbage collection frequency, or a wear leveling parameter.

In Example 53, the subject matter of Example 52, wherein at least one of the host timeout interval or the watchdog timer are changed based on a measure of time relative to receipt of a given command and receipt of a subsequent reset signal from the host for the given command.

In Example 54, the subject matter of any of Examples 43-53, comprising means for updating the host model to account for the inconsistency.

In Example 55, the subject matter of Example 54, wherein the means for updating the host model include means for modifying an entry of an average characteristic for the set of commands to include the inconsistency in the average characteristic.

In Example 56, the subject matter of any of Examples 54-55, wherein the average characteristic is one of data size, pendency interval, relationship to other types of memory device operations, or rate of arrival.

Example 57 is at least one machine-readable medium including instructions that, when executed by processing circuitry, cause the processing circuitry to perform operations to implement of any of Examples 1-56.

Example 58 is an apparatus comprising means to implement of any of Examples 1-56.

Example 59 is a system to implement of any of Examples 1-56.

Example 60 is a method to implement of any of Examples 1-56.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A memory device for host adaptive memory device optimization, the memory device comprising:
   storage to maintain a host model of interactions with a host; and processing circuitry to:
  measure an aspect of a command from the host to the memory device across several issuances of the command by the host, wherein the command is one of read, write, flush, erase, move, or garbage collection;
  compare the aspect of the command with a characteristic of the command stored in the host model to determine an inconsistency between the aspect and the characteristic; and
  modify an operation of the memory device based on the inconsistency, the operation being one of a host timeout interval, a write cache size, a flush frequency, a block alignment parameter, garbage collection frequency, or a wear leveling parameter.

2. The memory device of claim 1, wherein the aspect is one of data size, pendency interval, inter-command interval, relationship to other types of memory device operations, rate of arrival, depth of command queue.

3. The memory device of claim 1, wherein, to compare the aspect to the characteristic, the processing circuitry is configured to:
  retrieve a representation of the characteristic of a single command from the host model;
  compare a respective aspect of a subset of commands from the several issuances of the command to the representation of the characteristic; and
  determine that the respective aspect is larger or smaller than the representation of the characteristic by more than a threshold to produce the inconsistency.

4. The memory device of claim 3, wherein a number of the subset of commands is beyond a second threshold to produce the inconsistency.

5. The memory device of claim 1, wherein the several issuances of the command are in a command queue for the memory device, and wherein the inconsistency is a difference between a depth of the command queue and an average depth of the command queue stored in the host model.

6. The memory device of claim 1, wherein at least one of the host timeout interval or the watchdog timer are changed based on a measure of time relative to receipt of a given command and receipt of a subsequent reset signal from the host for the given command.

7. The memory device of claim 1, wherein the processing circuitry is configured to update the host model to account for the inconsistency including modifying an entry of the characteristic in the host model with an average of the aspect in the several issuances of the command.

8. A method for host adaptive memory device optimization in a memory device, the method comprising:
  maintaining a host model of interactions with a host;
  measuring an aspect of a command from the host to the memory device across several issuances of the command by the host, wherein the command is one of read, write, flush, erase, move, or garbage collection;
  comparing the aspect of the command with a characteristic of the command stored in the host model to determine an inconsistency between the aspect and the characteristic; and
  modify an operation of the memory device based on the inconsistency, the operation being one of a host timeout interval, a write cache size, a flush frequency, a block alignment parameter, garbage collection frequency, or a wear leveling parameter.

9. The method of claim 8, wherein the aspect is one of data size, pendency interval, inter-command interval, relationship to other types of memory device operations, rate of arrival, depth of command queue.

10. The method of claim 8, wherein comparing the aspect to the characteristic includes:
  retrieving a representation of the characteristic of a single command from the host model;
  comparing a respective aspect of a subset of commands from the several issuances of the command to the representation of the characteristic; and
  determining that the respective aspect is larger or smaller than the representation of the characteristic by more than a threshold to produce the inconsistency.

11. The method of claim 10, wherein a number of the subset of commands is beyond a second threshold to produce the inconsistency.

12. The method of claim 8, wherein the several issuances of the command are in a command queue for the memory device, and wherein the inconsistency is a difference between a depth of the command queue and an average depth of the command queue stored in the host model.

13. The method of claim 8, wherein at least one of the host timeout interval or the watchdog timer are changed based on a measure of time relative to receipt of a given command and receipt of a subsequent reset signal from the host for the given command.

14. The method of claim 8 comprising updating the host model to account for the inconsistency including modifying an entry of the characteristic in the host model with an average of the aspect in the several issuances of the command.

15. A non-transitory machine readable medium including instructions for host adaptive memory device optimization in a memory device, the instructions, when executed by processing circuitry, cause the processing circuitry to perform operations comprising:
  maintaining a host model of interactions with a host;
  measuring an aspect of a command from the host to the memory device across several issuances of the command by the host, wherein the command is one of read, write, flush, erase, move, or garbage collection;
  comparing the aspect of the command with a characteristic of the command stored in the host model to determine an inconsistency between the aspect and the characteristic; and
  modify an operation of the memory device based on the inconsistency, the operation being one of a host timeout interval, a write cache size, a flush frequency, a block alignment parameter, garbage collection frequency, or a wear leveling parameter.

16. The non-transitory machine readable medium of claim 15, wherein the aspect is one of data size, pendency interval, inter-command interval, relationship to other types of memory device operations, rate of arrival, depth of command queue.

17. The non-transitory machine readable medium of claim 15, wherein comparing the aspect to the characteristic includes:
  retrieving a representation of the characteristic of a single command from the host model;
  comparing a respective aspect of a subset of commands from the several issuances of the command to the representation of the characteristic; and
  determining that the respective aspect is larger or smaller than the representation of the characteristic by more than a threshold to produce the inconsistency.

18. The non-transitory machine readable medium of claim 17, wherein a number of the subset of commands is beyond a second threshold to produce the inconsistency.

19. The non-transitory machine readable medium of claim 15, wherein the several issuances of the command are in a command queue for the memory device, and wherein the inconsistency is a difference between a depth of the command queue and an average depth of the command queue stored in the host model.

20. The non-transitory machine readable medium of claim 15, wherein at least one of the host timeout interval or the watchdog timer are changed based on a measure of time relative to receipt of a given command and receipt of a subsequent reset signal from the host for the given command.

21. The non-transitory machine readable medium of claim 15, wherein the operations comprise updating the host model to account for the inconsistency including modifying an entry of the characteristic in the host model with an average of the aspect in the several issuances of the command.

* * * * *